L. A. YOUNG.
SPRING SEAT STRUCTURE.
APPLICATION FILED DEC. 26, 1908.

1,050,900.

Patented Jan. 21, 1913.
2 SHEETS—SHEET 1.

Witnesses
O. B. Baenziger.
J. G. Howlett.

Inventor
Leonard A. Young.
By
E. A. Wheeler & Co.
Attorneys

L. A. YOUNG.
SPRING SEAT STRUCTURE.
APPLICATION FILED DEC. 26, 1908.
1,050,900.
Patented Jan. 21, 1913.
2 SHEETS—SHEET 2.
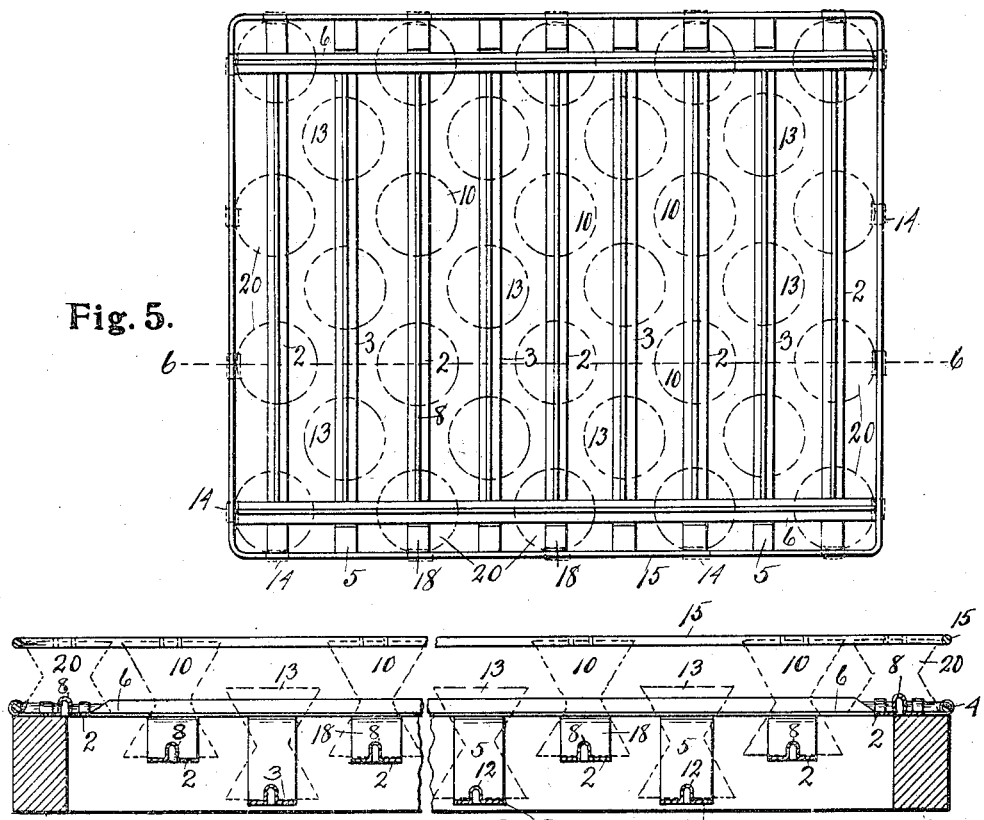
Fig. 5.
Fig. 6.
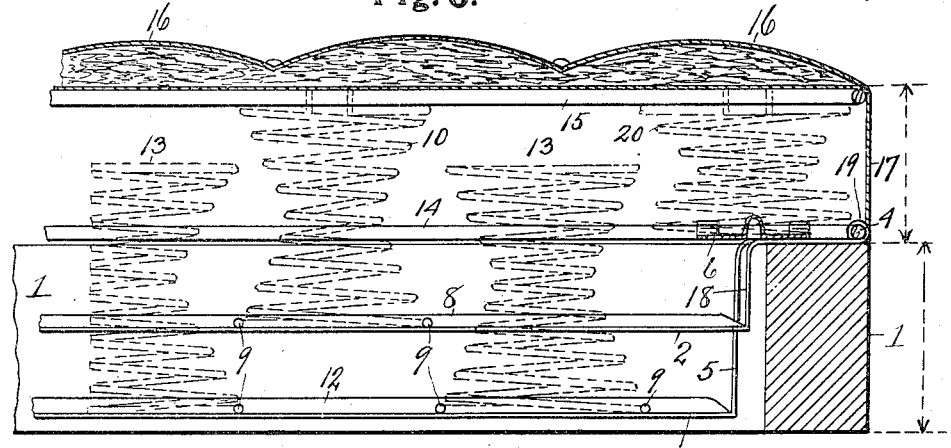
Fig. 7.
Witnesses
Inventor
Leonard A. Young.
By
Attorneys

UNITED STATES PATENT OFFICE.

LEONARD A. YOUNG, OF DETROIT, MICHIGAN.

SPRING-SEAT STRUCTURE.

1,050,900.

Specification of Letters Patent.   Patented Jan. 21, 1913.

Application filed December 26, 1908. Serial No. 469,472.

*To all whom it may concern:*

Be it known that I, LEONARD A. YOUNG, a citizen of the United States, residing at Detroit, in the county of Wayne, State of Michigan, have invented certain new and useful Improvements in Spring-Seat Structures; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to spring seat structures, especially designed for use in motor vehicles, and consists in the construction and arrangement of parts hereinafter more fully set forth and pointed out particularly in the claims.

The primary object of the invention is to provide in a spring seat structure a soft or spring edged cushion, wherein the arrangement is such that the leather facing at the front of the cushion may be materially reduced in height, and a cushion provided with the requisite amount of spring in the center.

A further object is to provide a cushion having the above mentioned characteristics wherein provision is made for affording a soft top which will yield readily under a light pressure, the arrangement being such as to afford an increased spring resistance when the top of the cushion is depressed a predetermined distance.

A further object of the invention is to provide a soft or spring edged seat cushion having the required depth of spring in the center thereof, and wherein provision is made for reducing the height of the leather facing at the front of the cushion and preventing the buckling of said facing as is common in seats of the usual construction.

The above objects are attained by the formation, arrangement, and association of parts illustrated in the accompanying drawings, in which:—

Figure 1:
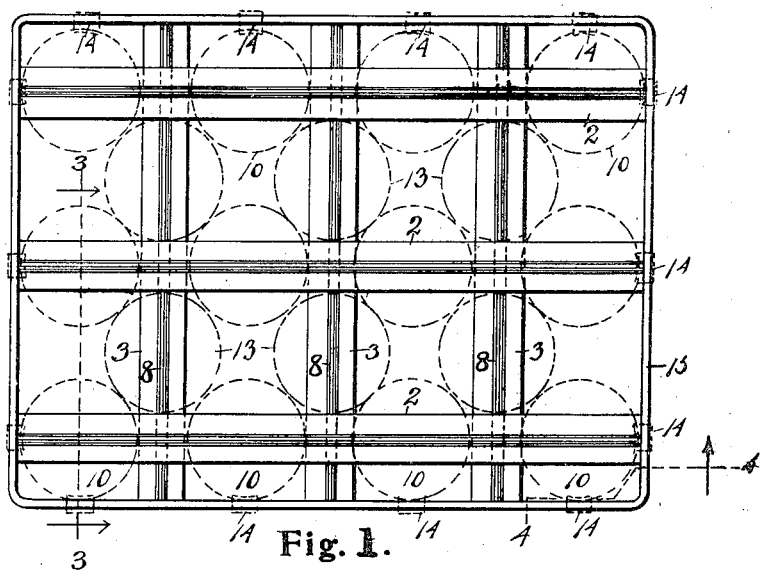
Figure 2:
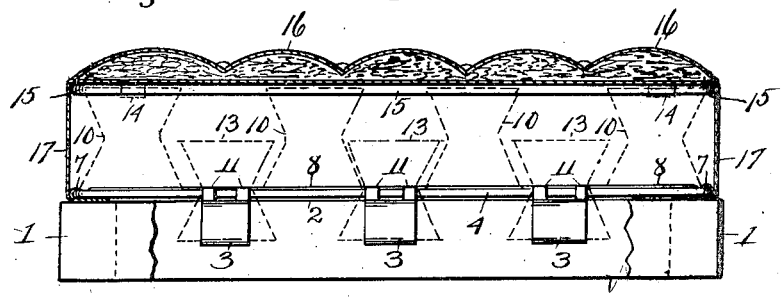
Figures 3, 4:
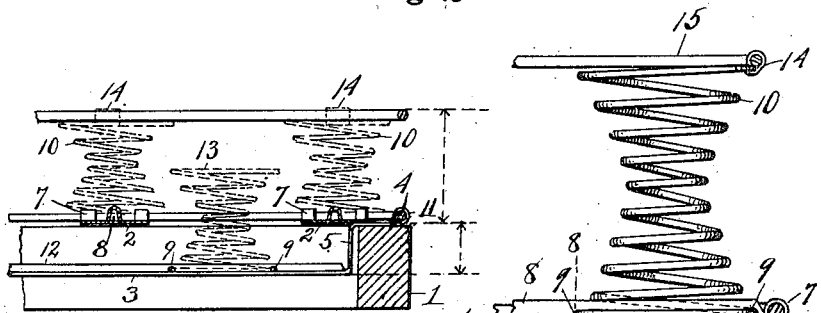
Figure 8:

Figure 1 is a plan view of a spring seat structure involving my invention, the springs appearing in dotted lines. Fig. 2 is a view showing a portion of the seat frame broken away, the leather covering in section and the springs in dotted lines. Fig. 3 is a fragmentary view in section as on line 3—3 of Fig. 1, the seat frame omitted in Fig. 1 being included in Fig. 3. Fig. 4 is a fragmentary view in section as on line 4—4 of Fig. 1. Fig. 5 is a plan view of a seat structure of a modified form, the springs appearing in dotted lines. Fig. 6 is a transverse section through the spring seat structure and the seat frame, as on line 6—6 of Fig. 5. Fig. 7 is an enlarged fragmentary view in section through the seat frame, the border frames of the seat structure and the leather of the seat cover. Fig. 8 is a fragmentary view in transverse section through one of the supporting bars as on line 8—8 of Fig. 4.

Referring to the characters of reference, 1 designates the seat frame which is usually formed of wood and is rectangular in structure. Upon the seat frame the spring seat structure is mounted, said structure in accordance with this invention consisting of the base strips 2 and 3 attached at their ends to the border frame 4. The base strips 2 and 3 are at right angles to one another, the strips 2 crossing between two sides of the border frame 4 on a plane with said border frame and the top of the seat frame, while the base strips 3 are depressed within the central opening of the seat frame considerably below the plane of the base strips 2, and are provided with terminal portions 5 which extend upwardly to the top of the seat frame and thence horizontally to the border frame 4 to the opposite sides of which they are attached. The construction above described wherein the upper and lower series of base strips are caused to cross the frame of the seat structure at right angles is illustrated in Figs. 1, 2 and 3. The two series or sets of base strips however, may be caused to extend in the same direction instead of crossing at right angles, which latter structure is shown in Figs. 5, 6 and 7, wherein the upper set of base strips 2 is arranged to extend parallel with the lower set of base strips 3. The only strips in this structure which cross the base strips are the marginal strips 6.

Referring now more particularly to the construction shown in Figs. 1 to 4 inclusive, the lower border frame 4 is designed to rest upon the upper edge of the seat frame 1 and the upper base strips 2 of the spring seat structure are attached at their opposite ends as shown at 7, to the border frame 4 and extend between opposite sides of said frame in the plane thereof, said strips having a central longitudinally extending strengthening rib 8 raised from the upper surface thereof and pierced transversely to form registering apertures 9 through which the lower coils of the primary springs 10 are passed to firmly mount the springs thereon, as may be seen on referring to Fig. 4. The lower base strips 3 which are depressed below the top of the seat frame in the manner before described and whose terminals are attached at 11 to opposite sides of the border frame 4, are in like manner provided with strengthening ribs 12 through which the lower coils of the secondary springs 13 are passed to mount said springs thereon.

The border springs of the primary set 10 are connected by means of a suitable clip 14 (see Fig. 4) to the upper border frame 15, the intermediate springs of the primary set being unsupported at their upper ends. The springs 13 of the secondary set are interposed between the springs of the primary set and are entirely unsupported except at their base where they are attached to the base strips 3. The springs of the primary and secondary sets are of the same height; therefore by depressing the base strips upon which the secondary set is mounted, a distance equal to one half the height of said spring below the plane of the base of the primary set, the tops of the springs of the secondary set are caused to extend upwardly only to a point about midway of the height of the primary springs, whereby the upholstered top 16 of the cushion is supported normally by the springs of the primary set only, rendering said top soft. A weight upon the cushion however, sufficient to overcome the resistance of the springs of the primary set, will depress the top of the cushion sufficiently to cause it to rest upon the upper ends of the secondary set of springs, thereby bringing said latter springs into play and increasing the spring resistance of the cushion sufficiently to sustain the increased weight and at the same time afford a comfortable seat.

It is customary to make the springs in seat cushions six inches in height. In the arrangement shown in Figs. 1 and 4, two sets of springs four inches in height are employed which are so disposed as to afford the requisite depth of spring and produce a spring seat having a soft top, at the same time making it possible to reduce the leather facing 17 at the front of the cushion from a height of six inches, as commonly employed, to a height of four inches or less, affording also by this structure a soft or spring edged cushion; the leather facing which extends between the lower border frame 4 and the upper border frame 15 being secured to said frames in any suitable manner. By reducing the height of the leather facing, the liability of the buckling of said facing after the cushion has been in use some time, is obviated, preventing a protrusion of the facing which renders the cushion unsightly. Should it be desired to further reduce the height of the leather facing 17 at the edge of the cushion, the sets of base strips upon which the springs are mounted may both be depressed within the opening of the seat frame, as clearly shown in Figs. 6 and 7, wherein the lower base strips 3 are lowered still farther within the seat opening than in the construction shown in Figs. 1 and 2, while the upper base strips 2 are depressed within the seat opening to about the extent the base strips 3 are depressed in the structure shown in Figs. 2 and 3. To accommodate this arrangement the upwardly extending end portions 5 of the strips 3 are made longer while the strips 2 are provided with upwardly and horizontally extending end portions 18 whose terminals are attached at 19 to the border frame 4. By depressing both series of base strips which form the supports for the primary and secondary sets or series of springs within the seat frame opening, a still greater reduction in the height of the leather facing 17 is made possible, as shown in Fig. 7, at the same time making possible the employment of springs of the same height as used in the construction previously described with the exception that the border springs 20 are shorter than the corresponding springs in the previously described structure; in other respects the arrangement is the same as that shown in Figs. 1 to 4 inclusive, with the exception that the base strips 2 and 3 which comprise the upper and lower supporting bases or frames for the sets of springs, extend parallel instead of crossing at right angles, an arrangement which facilitates somewhat the assembling of the parts but which is not absolutely necessary to follow as the supporting strips of the upper and lower bases or frames may be made to cross at right angles, if desired.

In the arrangement shown in Figs. 5 to 7 inclusive the border springs 20 are mounted upon the marginal strips 2 and the marginal cross strips 6, while the primary and secondary springs of the seat structure are located within the border springs, as shown.

Having thus fully set forth my invention, what I claim as new and desire to secure by Letters Patent, is:—

1. A spring seat structure comprising a seat frame, a plurality of upper spring supporting strips, a plurality of lower spring supporting strips, the terminals of said strips being attached to the upper face of said frame, a set of primary springs mounted upon said upper supporting strips, a set of secondary springs mounted upon said lower supporting strips, the springs of the two sets being substantially of the same length, the tops of the secondary set of springs being unattached and terminating below the tops of the springs of the primary set, and the tops of both sets of springs extending above the seat frame.

2. In a spring seat structure, the combination with a rigid seat frame having a central opening, of a frame forming a support for the cushion springs depressed within the opening of said seat frame and supported thereon, two sets of springs mounted upon said depressed frame and projecting above the top of the seat frame, one set of said springs extending above the other and the upper ends of the lowermost set being unsupported by the seat frame, and free to move vertically and laterally, an upper border frame, and relatively short border springs mounted on the upper edge of the seat frame and wholly supporting said border frame.

3. In a spring seat structure, the combination with a seat frame, of base strips forming a supporting frame for the cushion springs, said strips being depressed between their ends within the opening of the seat frame, a lower border frame to which the ends of said strips are attached and which is supported on the upper face of the seat frame, a set of primary springs supported on said base strips, a set of secondary springs supported at their lower ends only on said base strips, and having their tops terminating below the tops of said primary springs but above the seat frame, an upper border frame above and free from the upper ends of the secondary springs, and relatively short border springs supporting the upper border frame on a plane with the tops of said primary springs.

4. In a spring seat construction, the combination with a seat frame, of a spring supporting frame comprising a plurality of upper spring supporting strips, a plurality of lower spring supporting strips, a set of primary springs mounted upon said upper supporting strips, a set of secondary springs mounted on said lower supporting strips and having unattached upper ends, the tops of the primary springs extending above the tops of the secondary springs, an upper border frame above and free from the tops of said secondary springs, and a plurality of relatively short border springs mounted on the seat frame and supporting said border frame on a plane with the tops of the springs of the primary set.

5. In a spring seat structure, the combination of a supporting frame comprising a seat frame and a plurality of spring supporting strips attached thereto, a plurality of secondary springs mounted upon said strips, a plurality of primary springs mounted upon said strips and extending above the tops of said secondary springs, the ends of both sets of springs extending above the seat frame, a lower border frame to which the ends of the supporting strips are attached lying on the seat frame, an upper border frame above the tops of the secondary springs, a plurality of relatively short border springs mounted upon the seat frame and wholly supporting the upper border frame on a plane with the tops of the primary springs, a facing of fabric extending between and attached at its margins to the lower and upper border frames, and an upholstered covering over the border frame and springs.

6. In a spring seat structure, the combination with a relatively deep seat frame forming a base, of a frame forming a support for the cushion springs, comprising a border member and transverse spring supporting strips crossing between the margins of said border member, said strips being depressed below the top of the seat frame to lie within the area thereof, the border member of the spring supporting frame resting upon the top of said seat frame, and a plurality of seat springs of unequal height mounted upon the depressed portions of said spring supporting strips, the top of each of said springs extending above the top of the seat frame and the tops of the shorter springs being free to move vertically and laterally.

In testimony whereof, I sign this specification in the presence of two witnesses.

LEONARD A. YOUNG.

Witnesses:
O. B. BAENZIGER,
I. G. HOWLETT.